United States Patent
Nguyen et al.

(10) Patent No.: US 8,613,320 B2
(45) Date of Patent: *Dec. 24, 2013

(54) COMPOSITIONS AND APPLICATIONS OF RESINS IN TREATING SUBTERRANEAN FORMATIONS

(75) Inventors: Philip D. Nguyen, Duncan, OK (US); David L. Brown, Temple, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/070,301

(22) Filed: Feb. 15, 2008

(65) Prior Publication Data

US 2008/0135251 A1 Jun. 12, 2008

Related U.S. Application Data

(63) Continuation-in-part of application No. 11/482,601, filed on Jul. 6, 2006, and a continuation-in-part of application No. 11/880,230, filed on Aug. 30, 2007, which is a continuation-in-part of application No. 11/351,931, filed on Feb. 10, 2006.

(51) Int. Cl.
*E21B 33/13* (2006.01)
*E21B 43/26* (2006.01)

(52) U.S. Cl.
USPC ........................... 166/295; 166/308.1

(58) Field of Classification Search
USPC .................. 166/285, 292, 293, 294, 295
See application file for complete search history.

(56) References Cited

U.S. PATENT DOCUMENTS

| | | | |
|---|---|---|---|
| 2,238,671 A | 4/1941 | Woodhouse | 166/21 |
| 2,345,611 A * | 4/1944 | William et al. | 166/295 |
| 2,556,169 A * | 6/1951 | Crouch et al. | 166/295 |
| 2,604,947 A | 7/1952 | Martin et al. | |
| 2,611,750 A | 9/1952 | White et al. | |
| 2,703,316 A | 3/1955 | Schneider | 260/78.3 |
| 2,869,642 A | 1/1959 | McKay et al. | 166/4 |
| 3,047,067 A | 7/1962 | Williams et al. | 166/33 |
| 3,052,298 A | 9/1962 | Malott | |
| 3,070,165 A | 12/1962 | Stratton | |
| 3,123,138 A | 3/1964 | Robichaux | 166/33 |
| 3,173,484 A | 3/1965 | Huitt et al. | |
| 3,176,768 A | 4/1965 | Brandt et al. | 166/33 |
| 3,195,635 A | 7/1965 | Fast | |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,302,719 A | 2/1967 | Fischer | |
| 3,308,885 A | 3/1967 | Sandiford | 166/33 |
| 3,308,886 A | 3/1967 | Evans | |
| 3,310,111 A | 3/1967 | Pavlich et al. | |
| 3,316,965 A | 5/1967 | Watanabe | 166/33 |
| 3,329,204 A | 7/1967 | Brieger | |
| 3,336,980 A | 8/1967 | Rike | 166/33 |
| 3,364,995 A | 1/1968 | Atkins et al. | |
| 3,366,178 A | 1/1968 | Malone et al. | |
| 3,371,712 A | 3/1968 | Adams | |
| 3,373,106 A | 3/1968 | Lister et al. | |
| 3,375,872 A | 4/1968 | McLaughlin et al. | 166/29 |
| 3,378,074 A | 4/1968 | Kiel | |
| 3,404,735 A * | 10/1968 | Young et. al. | 166/295 |
| 3,415,320 A | 12/1968 | Young | 166/33 |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | 117/62.2 |
| 3,509,951 A | 5/1970 | Enochs | |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | 166/280 |
| 3,681,287 A | 8/1972 | Brown et al. | 260/67 |
| 3,708,013 A | 1/1973 | Dismukes | 166/276 |
| 3,709,298 A | 1/1973 | Pramann | 166/276 |
| 3,709,641 A | 1/1973 | Sarem | |
| 3,741,308 A | 6/1973 | Veley | |
| 3,743,019 A | 7/1973 | Totty | |
| 3,754,598 A | 8/1973 | Holloway, Jr. | 166/249 |
| 3,765,804 A | 10/1973 | Brandon | 417/540 |

(Continued)

FOREIGN PATENT DOCUMENTS

| | | | |
|---|---|---|---|
| CA | 2063877 | 5/2003 | |
| EP | 0313243 B1 | 10/1988 | E21B 43/02 |
| EP | 0528595 A1 | 8/1992 | C08G 59/18 |
| EP | 0506934 | 10/1992 | |
| EP | 0510762 B1 | 11/1992 | C11D 17/00 |
| EP | 0643196 A2 | 6/1994 | E21B 43/02 |
| EP | 0834644 A2 | 4/1998 | E21B 43/02 |
| EP | 0853186 A2 | 7/1998 | E21B 43/02 |
| EP | 0864726 A2 | 9/1998 | E21B 43/26 |
| EP | 0879935 B1 | 11/1998 | E21B 43/26 |

(Continued)

OTHER PUBLICATIONS

Notice of Publication dated Dec. 20, 2007 from U.S. Appl. No. 11/880,230.
Office Action dated Apr. 7, 2008 from U.S. Appl. No. 11/880,230.
Office Action dated Mar. 19, 2008 from U.S. Appl. No. 11/482,601.
U.S. Appl. No. 12/080,647, filed Apr. 4, 2008, Dalrymple et al.

(Continued)

*Primary Examiner* — Angela M DiTrani
(74) *Attorney, Agent, or Firm* — Robert A. Kent; McDermott Will & Emery LLP

(57) ABSTRACT

Methods are provided that include a method comprising providing a resin composition comprising a resin and at least a plurality of filler particulates and introducing the resin composition into a well bore which penetrates at least a portion of a subterranean formation, wherein the resin composition does not form proppant aggregates or proppant particulates. In some embodiments, the resin composition may be introduced into the subterranean formation at a pressure below the fracture pressure of the subterranean formation. Additional methods and compositions are also provided.

17 Claims, No Drawings

(56) References Cited

U.S. PATENT DOCUMENTS

| | | | |
|---|---|---|---|
| 3,768,564 A | 10/1973 | Knox et al. ............... 166/307 |
| 3,769,070 A | 10/1973 | Schilt |
| 3,784,585 A | 1/1974 | Schmitt et al. .............. 260/861 |
| 3,819,525 A | 6/1974 | Hattenbrun ................. 252/132 |
| 3,826,310 A | 7/1974 | Karnes |
| 3,828,854 A | 8/1974 | Templeton et al. .......... 166/307 |
| 3,842,911 A | 10/1974 | Know et al. .................. 166/307 |
| 3,850,247 A | 11/1974 | Tinsley |
| 3,854,533 A | 12/1974 | Gurley et al. ............... 166/276 |
| 3,857,444 A | 12/1974 | Copeland .................... 166/276 |
| 3,861,467 A | 1/1975 | Harnsberger |
| 3,863,709 A | 2/1975 | Fitch ............................... 165/1 |
| 3,868,998 A | 3/1975 | Lybarger et al. ............. 166/278 |
| 3,878,893 A * | 4/1975 | Copeland .................... 166/276 |
| 3,888,311 A | 6/1975 | Cooke, Jr. .................... 166/280 |
| 3,912,692 A | 10/1975 | Casey et al. ................. 260/78.3 |
| 3,933,204 A | 1/1976 | Knapp |
| 3,933,205 A | 1/1976 | Kiel |
| 3,948,672 A | 4/1976 | Harnberger ..................... 106/90 |
| 3,955,993 A | 5/1976 | Curtice ........................... 106/90 |
| 3,960,736 A | 6/1976 | Free et al. ................. 252/8.55 R |
| 3,976,135 A | 8/1976 | Anderson |
| 3,977,472 A | 8/1976 | Graham et al. |
| 4,000,781 A | 1/1977 | Knapp .......................... 166/276 |
| 4,008,763 A | 2/1977 | Lowe et al. .................. 166/253 |
| 4,015,995 A | 4/1977 | Hess ............................. 106/287 |
| 4,018,285 A | 4/1977 | Watkins et al. |
| 4,029,148 A | 6/1977 | Emery ....................... 166/250.1 |
| 4,031,958 A | 6/1977 | Sandiford et al. ........... 166/270 |
| 4,042,032 A | 8/1977 | Anderson et al. ............ 166/276 |
| 4,060,988 A | 12/1977 | Arnold |
| 4,068,718 A | 1/1978 | Cooke, Jr. et al. |
| 4,070,865 A | 1/1978 | McLaughlin ..................... 61/36 |
| 4,074,760 A | 2/1978 | Copeland et al. ............ 166/276 |
| 4,085,801 A | 4/1978 | Sifferman et al. ........... 166/295 |
| 4,085,802 A | 4/1978 | Sifferman et al. |
| 4,089,437 A | 5/1978 | Chutter et al. |
| 4,127,173 A | 11/1978 | Watkins et al. .............. 166/276 |
| 4,169,798 A | 10/1979 | DeMartino ............. 252/8.55 R |
| 4,172,066 A | 10/1979 | Zweigle et al. ........ 260/29.6 TA |
| 4,220,566 A | 9/1980 | Constein et al. ............. 523/131 |
| 4,245,702 A | 1/1981 | Haafkens et al. ............ 166/307 |
| 4,247,430 A | 1/1981 | Constien |
| 4,259,205 A | 3/1981 | Murphey |
| 4,273,187 A | 6/1981 | Satter et al. ................. 166/250 |
| 4,291,766 A | 9/1981 | Davies et al. ................ 166/276 |
| 4,305,463 A | 12/1981 | Zakiewicz .................... 106/245 |
| 4,336,842 A | 6/1982 | Graham et al. ............... 166/276 |
| 4,352,674 A | 10/1982 | Fery ................................ 23/230 |
| 4,353,806 A | 10/1982 | Canter et al. ................. 507/229 |
| 4,387,769 A | 6/1983 | Erbstoesser et al. ......... 166/295 |
| 4,392,988 A | 7/1983 | Dobson et al. |
| 4,399,866 A | 8/1983 | Dearth |
| 4,415,805 A | 11/1983 | Fertl et al. ..................... 250/260 |
| 4,428,427 A | 1/1984 | Friedman |
| 4,439,489 A | 3/1984 | Johnson et al. ............... 428/404 |
| 4,441,556 A | 4/1984 | Powers et al. |
| 4,443,347 A | 4/1984 | Underdown et al. .... 252/8.55 R |
| 4,460,052 A | 7/1984 | Gockel ........................... 175/72 |
| 4,470,915 A | 9/1984 | Conway ................... 252/8.55 R |
| 4,493,875 A | 1/1985 | Beck et al. ................... 428/403 |
| 4,494,605 A | 1/1985 | Wiechel et al. ............... 166/288 |
| 4,498,995 A | 2/1985 | Gockel ..................... 252/8.5 LC |
| 4,501,328 A | 2/1985 | Nichols ......................... 166/276 |
| 4,526,695 A | 7/1985 | Erbstoesser et al. ..... 252/8.55 R |
| 4,527,627 A | 7/1985 | Graham et al. ............... 166/280 |
| 4,541,489 A | 9/1985 | Wu ................................ 166/312 |
| 4,546,012 A | 10/1985 | Brooks ........................ 427/213 |
| 4,553,596 A | 11/1985 | Graham et al. ............... 166/295 |
| 4,564,459 A | 1/1986 | Underdown et al. .... 252/8.55 R |
| 4,572,803 A | 2/1986 | Yamazoe et al. ............... 534/16 |
| 4,585,064 A | 4/1986 | Graham et al. ............... 166/280 |
| 4,649,998 A | 3/1987 | Friedman ...................... 166/294 |
| 4,662,449 A | 5/1987 | Friedman |
| 4,664,819 A | 5/1987 | Glaze et al. ................. 252/8.551 |
| 4,665,988 A | 5/1987 | Murphey et al. ............. 166/295 |
| 4,669,543 A | 6/1987 | Young ........................... 166/276 |
| 4,670,501 A | 6/1987 | Dymond et al. |
| 4,675,140 A | 6/1987 | Sparks et al. .................. 264/4.3 |
| 4,681,165 A | 7/1987 | Bannister |
| 4,683,954 A | 8/1987 | Walker et al. ................ 166/307 |
| 4,694,905 A | 9/1987 | Armbruster ................... 166/280 |
| 4,715,967 A | 12/1987 | Bellis ......................... 252/8.551 |
| 4,716,964 A | 1/1988 | Erbstoesser et al. .......... 166/284 |
| 4,733,729 A | 3/1988 | Copeland ..................... 166/276 |
| 4,739,832 A | 4/1988 | Jennings, Jr. et al. ......... 166/299 |
| 4,772,646 A | 9/1988 | Harms et al. |
| 4,777,200 A | 10/1988 | Dymond et al. |
| 4,785,884 A | 11/1988 | Armbruster ................... 166/280 |
| 4,787,453 A | 11/1988 | Hewgill et al. ............ 166/272.3 |
| 4,789,105 A | 12/1988 | Hosokawa et al. ............. 241/67 |
| 4,796,701 A | 1/1989 | Hudson et al. ................ 166/278 |
| 4,797,262 A | 1/1989 | Dewitz .......................... 422/142 |
| 4,800,960 A | 1/1989 | Friedman et al. ............. 166/276 |
| 4,809,783 A | 3/1989 | Hollenbeck et al. .......... 166/307 |
| 4,817,721 A | 4/1989 | Pober ............................ 166/295 |
| 4,829,100 A | 5/1989 | Murphey et al. ............. 523/131 |
| 4,838,352 A | 6/1989 | Oberste-Padtberg et al. 166/291 |
| 4,842,070 A | 6/1989 | Sharp |
| 4,842,072 A | 6/1989 | Friedman et al. ............. 166/295 |
| 4,843,118 A | 6/1989 | Lai et al. ....................... 524/555 |
| 4,848,467 A | 7/1989 | Cantu et al. ................... 166/281 |
| 4,848,470 A | 7/1989 | Korpics ......................... 166/312 |
| 4,850,430 A | 7/1989 | Copeland et al. ............. 166/276 |
| 4,875,525 A | 10/1989 | Mana |
| 4,886,354 A | 12/1989 | Welch et al. ..................... 356/70 |
| 4,888,240 A | 12/1989 | Graham et al. ............... 428/403 |
| 4,892,147 A | 1/1990 | Jennings, Jr. et al. |
| 4,895,207 A | 1/1990 | Friedman et al. ............. 166/276 |
| 4,898,750 A | 2/1990 | Friedman et al. |
| 4,903,770 A | 2/1990 | Friedman et al. ............. 166/288 |
| 4,921,576 A | 5/1990 | Hurd |
| 4,934,456 A | 6/1990 | Moradi-Araghi ............. 166/270 |
| 4,936,385 A | 6/1990 | Weaver et al. ................ 166/288 |
| 4,942,186 A | 7/1990 | Murphey et al. ............. 523/131 |
| 4,957,165 A | 9/1990 | Cantu et al. ................... 166/295 |
| 4,959,432 A | 9/1990 | Fan et al. ...................... 526/287 |
| 4,961,466 A | 10/1990 | Himes et al. .................. 166/250 |
| 4,969,522 A | 11/1990 | Whitehurst et al. .......... 166/104 |
| 4,969,523 A | 11/1990 | Martin et al. ................. 166/278 |
| 4,984,635 A | 1/1991 | Cullick et al. |
| 4,986,353 A | 1/1991 | Clark et al. ................... 166/279 |
| 4,986,354 A | 1/1991 | Cantu et al. ................... 166/279 |
| 4,986,355 A | 1/1991 | Casad et al. .................. 166/295 |
| 5,030,603 A | 7/1991 | Rumpf et al. ................. 501/127 |
| 5,049,743 A | 9/1991 | Taylor, III et al. ............. 250/303 |
| 5,056,597 A | 10/1991 | Stowe, III et al. |
| 5,082,056 A | 1/1992 | Tackett, Jr. .................... 166/295 |
| 5,095,987 A | 3/1992 | Weaver et al. |
| 5,105,886 A | 4/1992 | Strubha et al. ................ 166/280 |
| 5,107,928 A | 4/1992 | Hilterhaus .................... 166/293 |
| 5,128,390 A * | 7/1992 | Murphey et al. ............. 523/130 |
| 5,135,051 A | 8/1992 | Facteau et al. ................ 166/104 |
| 5,142,023 A | 8/1992 | Gruber et al. ................. 528/354 |
| 5,165,438 A | 11/1992 | Facteau et al. .................... 137/1 |
| 5,173,527 A | 12/1992 | Calve ............................. 524/74 |
| 5,178,218 A | 1/1993 | Dees .............................. 166/281 |
| 5,182,051 A | 1/1993 | Bandy et al. .................. 252/645 |
| 5,199,491 A | 4/1993 | Kutts et al. .................... 166/276 |
| 5,199,492 A | 4/1993 | Surles et al. ................... 166/295 |
| 5,211,234 A | 5/1993 | Floyd ............................ 166/276 |
| 5,216,050 A | 6/1993 | Sinclair ......................... 524/108 |
| 5,218,038 A | 6/1993 | Johnson et al. ............... 524/541 |
| 5,232,955 A | 8/1993 | Caabai et al. ................... 521/63 |
| 5,232,961 A | 8/1993 | Murphey et al. ............. 523/414 |
| 5,238,068 A | 8/1993 | Fredrickson .................. 166/307 |
| 5,244,362 A | 9/1993 | Conally et al. |
| 5,247,059 A | 9/1993 | Gruber et al. ................. 528/354 |
| 5,249,627 A | 10/1993 | Harms et al. |
| 5,249,628 A | 10/1993 | Surjaatmadja ................ 166/305 |
| 5,256,729 A | 10/1993 | Kutts et al. .................... 524/700 |
| 5,265,678 A | 11/1993 | Grundmann |
| 5,273,115 A | 12/1993 | Spafford ....................... 166/281 |
| 5,278,203 A | 1/1994 | Harms |

(56) References Cited

U.S. PATENT DOCUMENTS

| | | | | |
|---|---|---|---|---|
| 5,285,849 A | 2/1994 | Surles et al. | | 166/295 |
| 5,293,939 A | 3/1994 | Surles et al. | | 166/295 |
| 5,295,542 A | 3/1994 | Cole et al. | | 166/278 |
| 5,320,171 A | 6/1994 | Laramay | | 166/285 |
| 5,321,062 A | 6/1994 | Landrum et al. | | 523/141 |
| 5,325,923 A | 7/1994 | Surjaatmadja et al. | | 166/308 |
| 5,330,005 A | 7/1994 | Card et al. | | 166/280 |
| 5,332,037 A | 7/1994 | Schmidt et al. | | 166/276 |
| 5,335,726 A | 8/1994 | Rodrigues | | 166/295 |
| 5,351,754 A | 10/1994 | Hardin et al. | | 166/249 |
| 5,358,047 A | 10/1994 | Himes et al. | | |
| 5,358,051 A | 10/1994 | Rodrigues | | 166/295 |
| 5,359,026 A | 10/1994 | Gruber | | 528/354 |
| 5,360,068 A | 11/1994 | Sprunt et al. | | 166/259 |
| 5,361,856 A | 11/1994 | Surjaatmajda et al. | | 175/67 |
| 5,363,916 A | 11/1994 | Himes et al. | | 166/276 |
| 5,363,917 A | 11/1994 | Jennings et al. | | |
| 5,373,901 A | 12/1994 | Norman et al. | | 166/300 |
| 5,377,756 A | 1/1995 | Northrop et al. | | |
| 5,377,759 A | 1/1995 | Surles | | 166/295 |
| 5,381,864 A | 1/1995 | Nguyen et al. | | 166/280 |
| 5,386,874 A | 2/1995 | Laramay et al. | | 166/300 |
| 5,388,648 A | 2/1995 | Jordan, Jr. | | 166/380 |
| 5,390,741 A | 2/1995 | Payton et al. | | |
| 5,393,810 A | 2/1995 | Harris et al. | | 524/56 |
| 5,396,957 A | 3/1995 | Surjaatmadja et al. | | 166/308 |
| 5,402,846 A | 4/1995 | Jennings, Jr. et al. | | 166/259 |
| 5,403,822 A | 4/1995 | Mueller et al. | | |
| 5,420,174 A | 5/1995 | Dewprashad | | |
| 5,422,183 A | 6/1995 | Sinclair et al. | | 428/403 |
| 5,423,381 A | 6/1995 | Surles et al. | | 166/295 |
| 5,436,396 A * | 7/1995 | Bailey et al. | | 523/130 |
| 5,439,055 A | 8/1995 | Card et al. | | 166/280 |
| 5,460,226 A | 10/1995 | Lawson et al. | | 166/300 |
| 5,464,060 A | 11/1995 | Hale et al. | | 166/293 |
| 5,475,080 A | 12/1995 | Gruber et al. | | 528/354 |
| 5,484,881 A | 1/1996 | Gruber et al. | | 528/54 |
| 5,492,177 A | 2/1996 | Yeh et al. | | |
| 5,492,178 A | 2/1996 | Nguyen et al. | | 166/276 |
| 5,494,103 A | 2/1996 | Surjaatmadja et al. | | 166/222 |
| 5,497,830 A | 3/1996 | Boles et al. | | 166/300 |
| 5,498,280 A | 3/1996 | Fistner et al. | | 106/19 |
| 5,499,678 A | 3/1996 | Surjaatmadja et al. | | 166/298 |
| 5,501,275 A | 3/1996 | Card et al. | | 166/280 |
| 5,505,787 A | 4/1996 | Yamaguchi | | 134/4 |
| 5,512,071 A | 4/1996 | Yam et al. | | 51/307 |
| 5,520,250 A | 5/1996 | Harry et al. | | 166/278 |
| 5,522,460 A | 6/1996 | Shu | | 166/295 |
| 5,529,123 A | 6/1996 | Carpenter et al. | | 166/293 |
| 5,531,274 A | 7/1996 | Bienvenu, Jr. | | 166/280 |
| 5,536,807 A | 7/1996 | Gruber et al. | | 528/354 |
| 5,545,824 A | 8/1996 | Stengel et al. | | 524/590 |
| 5,547,023 A | 8/1996 | McDaniel et al. | | 166/280 |
| 5,551,513 A | 9/1996 | Suries et al. | | 166/278 |
| 5,551,514 A | 9/1996 | Nelson et al. | | 166/280 |
| 5,582,249 A | 12/1996 | Caveny et al. | | 166/276 |
| 5,582,250 A | 12/1996 | Constien | | 166/280 |
| 5,588,488 A | 12/1996 | Vijn et al. | | 166/293 |
| 5,591,700 A | 1/1997 | Harris et al. | | 507/204 |
| 5,594,095 A | 1/1997 | Gruber et al. | | 528/354 |
| 5,595,245 A | 1/1997 | Scott, III | | 166/250.1 |
| 5,597,784 A | 1/1997 | Sinclair et al. | | |
| 5,604,184 A | 2/1997 | Ellis et al. | | 507/117 |
| 5,604,186 A | 2/1997 | Hunt et al. | | 507/204 |
| 5,609,207 A | 3/1997 | Dewprashad et al. | | 166/276 |
| 5,620,049 A | 4/1997 | Gipson et al. | | 166/248 |
| 5,639,806 A | 6/1997 | Johnson et al. | | 523/208 |
| 5,663,123 A | 9/1997 | Goodhue, Jr. et al. | | |
| 5,670,473 A | 9/1997 | Scepanski | | 510/445 |
| 5,692,566 A | 12/1997 | Surles | | 166/295 |
| 5,697,440 A | 12/1997 | Weaver et al. | | 166/281 |
| 5,697,448 A | 12/1997 | Johnson | | |
| 5,698,322 A | 12/1997 | Tsai et al. | | 428/373 |
| 5,701,956 A | 12/1997 | Hardy et al. | | |
| 5,712,314 A * | 1/1998 | Surles et al. | | 166/295 |
| 5,732,364 A | 3/1998 | Kalb et al. | | 588/8 |
| 5,738,136 A | 4/1998 | Rosenberg | | |
| 5,765,642 A | 6/1998 | Surjaatmadja | | 166/297 |
| 5,775,425 A | 7/1998 | Weaver et al. | | 166/276 |
| 5,782,300 A | 7/1998 | James et al. | | 166/278 |
| 5,783,822 A | 7/1998 | Buchanan et al. | | 250/259 |
| 5,787,986 A | 8/1998 | Weaver et al. | | 166/280 |
| 5,791,415 A | 8/1998 | Nguyen et al. | | 166/280 |
| 5,799,734 A | 9/1998 | Norman et al. | | 166/278 |
| 5,806,593 A | 9/1998 | Suries | | 166/270 |
| 5,830,987 A | 11/1998 | Smith | | 528/332 |
| 5,833,000 A | 11/1998 | Weaver et al. | | 166/276 |
| 5,833,361 A | 11/1998 | Funk | | 366/80 |
| 5,836,391 A | 11/1998 | Jonasson et al. | | 166/295 |
| 5,836,392 A | 11/1998 | Urlwin-Smith | | 166/295 |
| 5,836,393 A | 11/1998 | Johnson | | |
| 5,837,656 A | 11/1998 | Sinclair et al. | | 507/220 |
| 5,837,785 A | 11/1998 | Kinsho et al. | | 525/527 |
| 5,839,510 A | 11/1998 | Weaver et al. | | 166/276 |
| 5,840,784 A | 11/1998 | Funkhouser et al. | | 523/130 |
| 5,849,401 A | 12/1998 | El-Afandi et al. | | 428/215 |
| 5,849,590 A | 12/1998 | Anderson, II et al. | | 436/27 |
| 5,853,048 A | 12/1998 | Weaver et al. | | 166/279 |
| 5,864,003 A | 1/1999 | Qureshi et al. | | 528/141 |
| 5,865,936 A | 2/1999 | Edelman et al. | | 156/310 |
| 5,871,049 A | 2/1999 | Weaver et al. | | 166/276 |
| 5,873,413 A | 2/1999 | Chatterji et al. | | 166/293 |
| 5,874,490 A | 2/1999 | Arora et al. | | 523/414 |
| 5,875,844 A | 3/1999 | Chatterji et al. | | 166/293 |
| 5,875,845 A | 3/1999 | Chatterji et al. | | 166/293 |
| 5,875,846 A | 3/1999 | Chatterji et al. | | 166/293 |
| 5,893,383 A | 4/1999 | Facteau | | 137/14 |
| 5,893,416 A | 4/1999 | Read | | 166/304 |
| 5,901,789 A | 5/1999 | Donnelly et al. | | |
| 5,908,073 A | 6/1999 | Nguyen et al. | | 166/276 |
| 5,911,282 A | 6/1999 | Onan et al. | | 175/72 |
| 5,913,364 A | 6/1999 | Sweatman | | 166/281 |
| 5,916,933 A | 6/1999 | Johnson et al. | | 523/208 |
| 5,921,317 A | 7/1999 | Dewprashad et al. | | 166/208 |
| 5,924,488 A | 7/1999 | Nguyen et al. | | 166/280 |
| 5,929,437 A | 7/1999 | Elliott et al. | | 250/259 |
| 5,944,105 A | 8/1999 | Nguyen | | 166/278 |
| 5,944,106 A | 8/1999 | Dalrymple et al. | | |
| 5,945,387 A | 8/1999 | Chatterji et al. | | 507/224 |
| 5,948,734 A | 9/1999 | Sinclair et al. | | 507/219 |
| 5,957,204 A | 9/1999 | Chatterji et al. | | 166/295 |
| 5,960,784 A | 10/1999 | Ryan | | |
| 5,960,877 A | 10/1999 | Funkhouser | | 166/270 |
| 5,960,878 A | 10/1999 | Nguyen et al. | | |
| 5,960,880 A | 10/1999 | Nguyen et al. | | 166/280 |
| 5,964,291 A | 10/1999 | Bourne et al. | | 166/279 |
| 5,969,006 A | 10/1999 | Onan et al. | | 523/166 |
| 5,969,823 A | 10/1999 | Wurz et al. | | |
| 5,977,283 A | 11/1999 | Rossitto | | 528/44 |
| 5,994,785 A | 11/1999 | Higuchi et al. | | 527/789 |
| RE36,466 E | 12/1999 | Nelson et al. | | 166/280 |
| 6,003,600 A | 12/1999 | Nguyen et al. | | 166/281 |
| 6,004,400 A | 12/1999 | Bishop et al. | | 134/2 |
| 6,006,835 A | 12/1999 | Onan et al. | | 166/295 |
| 6,006,836 A * | 12/1999 | Chatterji et al. | | 166/295 |
| 6,012,524 A | 1/2000 | Chatterji et al. | | 166/295 |
| 6,016,870 A | 1/2000 | Dewprashad et al. | | 166/295 |
| 6,024,170 A | 2/2000 | McCabe et al. | | 166/300 |
| 6,028,113 A | 2/2000 | Scepanski | | 514/643 |
| 6,028,534 A | 2/2000 | Ciglenec et al. | | 340/856.2 |
| 6,035,936 A | 3/2000 | Whalen | | |
| 6,040,398 A | 3/2000 | Kinsho et al. | | 525/527 |
| 6,047,772 A | 4/2000 | Weaver et al. | | 166/276 |
| 6,059,034 A | 5/2000 | Rickards et al. | | 166/280 |
| 6,059,035 A | 5/2000 | Chatterji et al. | | 166/293 |
| 6,059,036 A | 5/2000 | Chatterji et al. | | 166/294 |
| 6,063,738 A | 5/2000 | Chatterji et al. | | |
| 6,068,055 A | 5/2000 | Chatterji et al. | | 166/293 |
| 6,069,117 A | 5/2000 | Onan et al. | | 507/202 |
| 6,070,667 A | 6/2000 | Gano | | |
| 6,074,739 A | 6/2000 | Katagiri | | 428/323 |
| 6,079,492 A | 6/2000 | Hoogteijling et al. | | 166/276 |
| 6,098,711 A | 8/2000 | Chatterji et al. | | 166/294 |
| 6,114,410 A | 9/2000 | Betzold | | 523/130 |

(56) References Cited

U.S. PATENT DOCUMENTS

| | | | | |
|---|---|---|---|---|
| 6,123,871 | A | 9/2000 | Carroll | 252/301.36 |
| 6,123,965 | A | 9/2000 | Jacon et al. | 424/489 |
| 6,124,246 | A | 9/2000 | Heathman et al. | 507/219 |
| 6,130,286 | A | 10/2000 | Thomas et al. | 524/507 |
| 6,131,661 | A | 10/2000 | Conner et al. | |
| 6,135,987 | A | 10/2000 | Tsai et al. | 604/365 |
| 6,140,446 | A | 10/2000 | Fujiki et al. | 528/15 |
| 6,143,698 | A | 11/2000 | Murphey et al. | |
| 6,148,911 | A | 11/2000 | Gipson et al. | 166/248 |
| 6,152,234 | A | 11/2000 | Newhouse et al. | 166/403 |
| 6,162,766 | A | 12/2000 | Muir et al. | 507/267 |
| 6,165,947 | A | 12/2000 | Chang et al. | |
| 6,167,967 | B1 | 1/2001 | Sweatman | 166/281 |
| 6,169,058 | B1 | 1/2001 | Le et al. | 507/222 |
| 6,172,011 | B1 | 1/2001 | Card et al. | 507/204 |
| 6,172,077 | B1 | 1/2001 | Curtis et al. | 514/278 |
| 6,176,315 | B1 | 1/2001 | Reddy et al. | 166/295 |
| 6,177,484 | B1 | 1/2001 | Surles | 523/131 |
| 6,184,311 | B1 | 2/2001 | O'Keefe et al. | 525/438 |
| 6,186,228 | B1 | 2/2001 | Wegener et al. | |
| 6,187,834 | B1 | 2/2001 | Thayer et al. | 522/15 |
| 6,187,839 | B1 | 2/2001 | Eoff | 523/130 |
| 6,189,615 | B1 | 2/2001 | Sydansk | 166/270 |
| 6,192,985 | B1 | 2/2001 | Hinkel et al. | 166/280 |
| 6,192,986 | B1 | 2/2001 | Urlwin-Smith | 166/295 |
| 6,196,317 | B1 | 3/2001 | Hardy | 166/295 |
| 6,202,751 | B1 | 3/2001 | Chatterji et al. | 166/276 |
| 6,209,643 | B1 | 4/2001 | Nguyen et al. | 166/276 |
| 6,209,644 | B1 | 4/2001 | Brunet | 166/297 |
| 6,209,646 | B1 | 4/2001 | Reddy et al. | 166/300 |
| 6,210,471 | B1 | 4/2001 | Craig | 106/31.08 |
| 6,214,773 | B1 | 4/2001 | Harris et al. | 507/271 |
| 6,231,664 | B1 | 5/2001 | Chatterji et al. | 106/724 |
| 6,234,251 | B1 | 5/2001 | Chatterji et al. | 166/295 |
| 6,238,597 | B1 | 5/2001 | Yim et al. | 252/512 |
| 6,241,019 | B1 | 6/2001 | Davidson et al. | 166/249 |
| 6,242,390 | B1 | 6/2001 | Mitchell et al. | 507/211 |
| 6,244,344 | B1 | 6/2001 | Chatterji et al. | 166/295 |
| 6,257,335 | B1 | 7/2001 | Nguyen et al. | 166/280 |
| 6,258,757 | B1 | 7/2001 | Sweatman et al. | 507/219 |
| 6,260,622 | B1 | 7/2001 | Blok et al. | 166/305.1 |
| 6,271,181 | B1 | 8/2001 | Chatterji et al. | 507/219 |
| 6,274,650 | B1 | 8/2001 | Cui | 523/457 |
| 6,279,652 | B1 | 8/2001 | Chatterji et al. | 166/194 |
| 6,279,656 | B1 | 8/2001 | Sinclair et al. | 166/310 |
| 6,283,214 | B1 | 9/2001 | Guinot et al. | 166/297 |
| 6,300,407 | B1 * | 10/2001 | Machleder et al. | 524/515 |
| 6,302,207 | B1 | 10/2001 | Nguyen et al. | 166/276 |
| 6,306,998 | B1 | 10/2001 | Kimura et al. | 528/12 |
| 6,310,008 | B1 | 10/2001 | Rietjens | |
| 6,311,773 | B1 | 11/2001 | Todd et al. | 166/280 |
| 6,315,040 | B1 | 11/2001 | Donnelly | |
| 6,321,841 | B1 | 11/2001 | Eoff et al. | 166/291 |
| 6,323,307 | B1 | 11/2001 | Bigg et al. | 528/354 |
| 6,326,458 | B1 | 12/2001 | Gruber et al. | 528/354 |
| 6,328,105 | B1 | 12/2001 | Betzold | 166/280 |
| 6,328,106 | B1 * | 12/2001 | Griffith et al. | 166/295 |
| 6,330,916 | B1 | 12/2001 | Rickards et al. | 166/280 |
| 6,330,917 | B2 | 12/2001 | Chatterji et al. | 166/295 |
| 6,342,467 | B1 | 1/2002 | Chang et al. | |
| 6,350,309 | B2 | 2/2002 | Chatterji et al. | 106/677 |
| 6,357,527 | B1 | 3/2002 | Norman et al. | 166/300 |
| 6,364,018 | B1 | 4/2002 | Brannon et al. | 166/280.2 |
| 6,364,945 | B1 | 4/2002 | Chatterji et al. | 106/677 |
| 6,367,165 | B1 | 4/2002 | Huttlin | 34/582 |
| 6,367,549 | B1 | 4/2002 | Chatterji et al. | 166/292 |
| 6,372,678 | B1 | 4/2002 | Youngsman et al. | 504/128 |
| 6,376,571 | B1 | 4/2002 | Chawla et al. | 522/64 |
| 6,387,986 | B1 | 5/2002 | Moradi-Araghi et al. | 523/211 |
| 6,390,195 | B1 | 5/2002 | Nguyen et al. | 166/276 |
| 6,394,181 | B2 | 5/2002 | Schnatzmeyer et al. | |
| 6,401,817 | B1 | 6/2002 | Griffith et al. | 166/295 |
| 6,405,796 | B1 | 6/2002 | Meyer et al. | |
| 6,405,797 | B2 | 6/2002 | Davidson et al. | 166/249 |
| 6,406,789 | B1 | 6/2002 | McDaniel et al. | 428/403 |
| 6,408,943 | B1 | 6/2002 | Schultz et al. | 166/285 |
| 6,415,509 | B1 | 7/2002 | Echols et al. | |
| 6,422,183 | B1 | 7/2002 | Kato | |
| 6,422,314 | B1 | 7/2002 | Todd et al. | 166/312 |
| 6,439,309 | B1 | 8/2002 | Matherly et al. | 166/276 |
| 6,439,310 | B1 | 8/2002 | Scott, III et al. | 166/308 |
| 6,440,255 | B1 | 8/2002 | Kohlhammer et al. | 156/283 |
| 6,446,727 | B1 | 9/2002 | Zemlak et al. | 166/308 |
| 6,448,206 | B1 | 9/2002 | Griffith et al. | 507/219 |
| 6,450,260 | B1 | 9/2002 | James et al. | 166/277 |
| 6,454,003 | B1 | 9/2002 | Chang et al. | 166/270 |
| 6,457,518 | B1 | 10/2002 | Castano-Mears et al. | |
| 6,458,885 | B1 | 10/2002 | Stengal et al. | 524/507 |
| 6,478,092 | B2 | 11/2002 | Voll et al. | |
| 6,485,947 | B1 | 11/2002 | Rajgarhia et al. | 435/139 |
| 6,488,091 | B1 | 12/2002 | Weaver et al. | 166/300 |
| 6,488,763 | B2 | 12/2002 | Brothers et al. | 106/692 |
| 6,494,263 | B2 | 12/2002 | Todd | 166/312 |
| 6,503,870 | B2 | 1/2003 | Griffith et al. | 507/219 |
| 6,508,305 | B1 | 1/2003 | Brannon et al. | 166/293 |
| 6,510,896 | B2 | 1/2003 | Bode et al. | |
| 6,520,255 | B2 | 2/2003 | Tolman et al. | |
| 6,527,051 | B1 | 3/2003 | Reddy et al. | 166/300 |
| 6,528,157 | B1 | 3/2003 | Hussain et al. | 428/325 |
| 6,531,427 | B1 | 3/2003 | Shuchart et al. | 507/267 |
| 6,534,449 | B1 | 3/2003 | Gilmour et al. | |
| 6,536,939 | B1 | 3/2003 | Blue | |
| 6,538,576 | B1 | 3/2003 | Schultz et al. | 340/859.6 |
| 6,543,545 | B1 | 4/2003 | Chatterji et al. | 166/381 |
| 6,550,959 | B2 | 4/2003 | Huber et al. | |
| 6,552,333 | B1 | 4/2003 | Storm et al. | 250/269.3 |
| 6,554,071 | B1 | 4/2003 | Reddy et al. | 166/293 |
| 6,555,507 | B2 | 4/2003 | Chatterji et al. | 507/219 |
| 6,569,814 | B1 | 5/2003 | Brady et al. | 507/201 |
| 6,582,819 | B2 | 6/2003 | McDaniel et al. | 428/402 |
| 6,588,926 | B2 | 7/2003 | Huber et al. | |
| 6,588,928 | B2 | 7/2003 | Huber et al. | |
| 6,593,402 | B2 | 7/2003 | Chatterji et al. | 524/7 |
| 6,599,863 | B1 | 7/2003 | Palmer et al. | 507/219 |
| 6,608,162 | B1 | 8/2003 | Chiu et al. | 528/129 |
| 6,609,578 | B2 | 8/2003 | Patel et al. | |
| 6,616,320 | B2 | 9/2003 | Huber et al. | 366/156.2 |
| 6,620,857 | B2 | 9/2003 | Valet | 522/42 |
| 6,626,241 | B2 | 9/2003 | Nguyen | 166/278 |
| 6,632,527 | B1 | 10/2003 | McDaniel et al. | 428/402 |
| 6,632,778 | B1 | 10/2003 | Ayoub et al. | 507/202 |
| 6,632,892 | B2 | 10/2003 | Rubinsztajn et al. | 525/476 |
| 6,642,309 | B2 | 11/2003 | Komitsu et al. | 525/100 |
| 6,648,501 | B2 | 11/2003 | Huber et al. | 366/301 |
| 6,659,179 | B2 | 12/2003 | Nguyen | 166/227 |
| 6,664,343 | B2 | 12/2003 | Narisawa et al. | 525/474 |
| 6,667,279 | B1 | 12/2003 | Hessert et al. | 507/225 |
| 6,668,926 | B2 | 12/2003 | Nguyen et al. | 166/280 |
| 6,669,771 | B2 | 12/2003 | Tokiwa et al. | 106/162.7 |
| 6,677,426 | B2 | 1/2004 | Noro et al. | 528/93 |
| 6,681,856 | B1 | 1/2004 | Chatterji et al. | 166/294 |
| 6,686,328 | B1 | 2/2004 | Binder | 510/446 |
| 6,705,400 | B1 | 3/2004 | Nguyen et al. | 166/281 |
| 6,710,019 | B1 | 3/2004 | Sawdon et al. | 507/136 |
| 6,713,170 | B1 | 3/2004 | Kaneka et al. | 428/323 |
| 6,725,926 | B2 | 4/2004 | Nguyen et al. | 166/254.1 |
| 6,725,930 | B2 | 4/2004 | Boney et al. | 166/280 |
| 6,725,931 | B2 | 4/2004 | Nguyen et al. | 166/280.2 |
| 6,729,404 | B2 | 5/2004 | Nguyen et al. | 166/280.2 |
| 6,729,405 | B2 | 5/2004 | DiLullo et al. | |
| 6,732,800 | B2 | 5/2004 | Acock et al. | 166/308 |
| 6,745,159 | B1 | 6/2004 | Todd et al. | 703/10 |
| 6,749,025 | B1 | 6/2004 | Brannon et al. | 166/305.1 |
| 6,753,299 | B2 | 6/2004 | Lunghofer et al. | 507/269 |
| 6,763,888 | B1 | 7/2004 | Harris et al. | 166/305.1 |
| 6,764,981 | B1 | 7/2004 | Eoff et al. | 507/110 |
| 6,766,858 | B2 | 7/2004 | Nguyen et al. | 166/300 |
| 6,776,235 | B1 | 8/2004 | England | |
| 6,776,236 | B1 | 8/2004 | Nguyen | 166/279 |
| 6,920,929 | B2 | 9/2004 | Nguyen et al. | 166/280.2 |
| 6,817,414 | B2 | 11/2004 | Lee | 166/278 |
| 6,830,105 | B2 | 12/2004 | Thesing | 166/276 |
| 6,832,650 | B2 | 12/2004 | Nguyen et al. | 166/279 |
| 6,832,655 | B2 | 12/2004 | Ravensbergen et al. | |

(56) References Cited

U.S. PATENT DOCUMENTS

| | | | |
|---|---|---|---|
| 6,837,309 B2 | 1/2005 | Boney et al. | |
| 6,840,318 B2 | 1/2005 | Lee et al. | 166/293 |
| 6,851,474 B2 | 2/2005 | Nguyen | 166/279 |
| 6,852,173 B2 | 2/2005 | Banerjee et al. | 134/26 |
| 6,861,394 B2 | 3/2005 | Ballard et al. | 507/269 |
| 6,866,099 B2 | 3/2005 | Nguyen | |
| 6,877,560 B2 | 4/2005 | Nguyen et al. | 507/200 |
| 6,881,709 B2 | 4/2005 | Nelson et al. | |
| 6,886,635 B2 | 5/2005 | Hossaini et al. | 166/278 |
| 6,887,834 B2 | 5/2005 | Nguyen et al. | 507/221 |
| 6,892,813 B2 | 5/2005 | Nguyen et al. | 166/280 |
| 6,949,491 B2 | 9/2005 | Cooke, Jr. | 507/219 |
| 6,962,200 B2 | 11/2005 | Nguyen et al. | 166/280 |
| 6,978,836 B2 | 12/2005 | Nguyen et al. | 166/295 |
| 6,981,560 B2 | 1/2006 | Nguyen et al. | 175/57 |
| 6,997,259 B2 * | 2/2006 | Nguyen | 166/276 |
| 7,007,752 B2 | 3/2006 | Reddy et al. | 166/285 |
| 7,013,976 B2 | 3/2006 | Nguyen et al. | 166/281 |
| 7,017,665 B2 | 3/2006 | Nguyen et al. | 166/281 |
| 7,021,379 B2 | 4/2006 | Nguyen et al. | 166/281 |
| 7,025,134 B2 | 4/2006 | Byrd et al. | 166/90.1 |
| 7,028,774 B2 | 4/2006 | Nguyen et al. | |
| 7,032,667 B2 | 4/2006 | Nguyen et al. | |
| 7,036,589 B2 | 5/2006 | Nguyen | 166/280.1 |
| 7,040,403 B2 | 5/2006 | Nguyen et al. | 166/281 |
| 7,044,220 B2 | 5/2006 | Nguyen et al. | 166/279 |
| 7,049,272 B2 | 5/2006 | Sinclair et al. | 507/230 |
| 7,059,406 B2 | 6/2006 | Nguyen | 166/278 |
| 7,063,150 B2 | 6/2006 | Slabaugh et al. | |
| 7,066,258 B2 | 6/2006 | Justus et al. | 166/295 |
| 7,073,581 B2 | 7/2006 | Nguyen et al. | 166/250.12 |
| 7,080,688 B2 | 7/2006 | Todd et al. | |
| 7,081,439 B2 | 7/2006 | Sullivan et al. | |
| 7,089,167 B2 | 8/2006 | Poe | 703/10 |
| 7,093,658 B2 | 8/2006 | Chatterji et al. | |
| 7,104,325 B2 | 9/2006 | Nguyen et al. | 166/295 |
| 7,114,560 B2 | 10/2006 | Nguyen et al. | 166/249 |
| 7,114,570 B2 | 10/2006 | Nguyen et al. | 166/295 |
| 7,117,942 B2 | 10/2006 | Dalrymple et al. | |
| 7,131,491 B2 | 11/2006 | Blauch et al. | 166/280.2 |
| 7,136,841 B2 | 11/2006 | Cook | |
| 7,153,575 B2 | 12/2006 | Anderson et al. | 428/407 |
| 7,156,194 B2 | 1/2007 | Nguyen | 175/72 |
| 7,166,560 B2 | 1/2007 | Still et al. | 507/260 |
| 7,178,596 B2 | 2/2007 | Blauch et al. | |
| 7,204,311 B2 | 4/2007 | Welton et al. | 166/295 |
| 7,210,528 B1 | 5/2007 | Brannon et | |
| 7,211,547 B2 * | 5/2007 | Nguyen | 507/202 |
| 7,216,711 B2 | 5/2007 | Nguyen et al. | 166/280.2 |
| 7,237,609 B2 | 7/2007 | Nguyen | 166/280.2 |
| 7,252,146 B2 | 8/2007 | Slabaugh et al. | |
| 7,255,169 B2 | 8/2007 | Van Batenburg et al. | 166/280.2 |
| 7,261,156 B2 | 8/2007 | Nguyen et al. | |
| 7,264,051 B2 | 9/2007 | Nguyen et al. | |
| 7,264,052 B2 | 9/2007 | Nguyen et al. | |
| 7,265,079 B2 | 9/2007 | Willberg et al. | 507/273 |
| 7,267,171 B2 | 9/2007 | Dusterhoft et al. | 166/280 |
| 7,267,717 B2 | 9/2007 | Watanabe et al. | |
| 7,273,099 B2 | 9/2007 | East, Jr. et al. | |
| 7,281,580 B2 | 10/2007 | Nguyen et al. | 166/280.2 |
| 7,281,581 B2 | 10/2007 | Nguyen et al. | 166/280.2 |
| 7,281,583 B2 | 10/2007 | Whitfill et al. | |
| 7,299,875 B2 | 11/2007 | Nguyen et al. | 166/281 |
| 7,306,037 B2 | 12/2007 | Nguyen et al. | 166/295 |
| 7,334,635 B2 | 2/2008 | Nguyen | |
| 7,334,636 B2 | 2/2008 | Nguyen | |
| 7,343,973 B2 | 3/2008 | Dusterhoft et al. | |
| 7,541,318 B2 | 6/2009 | Weaver et al. | |
| 7,766,099 B2 | 8/2010 | Nguyen | |
| 7,819,192 B2 | 10/2010 | Weaver et al. | |
| 2001/0016562 A1 | 8/2001 | Muir et al. | 507/239 |
| 2002/0036088 A1 | 3/2002 | Todd | |
| 2002/0043370 A1 | 4/2002 | Poe | |
| 2002/0048676 A1 * | 4/2002 | McDaniel et al. | 428/404 |
| 2002/0070020 A1 | 6/2002 | Nguyen | 166/281 |
| 2002/0104217 A1 | 8/2002 | Echols et al. | |
| 2002/0160920 A1 | 10/2002 | Dawson et al. | |
| 2002/0169085 A1 | 11/2002 | Miller et al. | |
| 2002/0189808 A1 | 12/2002 | Nguyen et al. | |
| 2003/0006036 A1 | 1/2003 | Malone et al. | 166/250.12 |
| 2003/0013871 A1 | 1/2003 | Mallon et al. | |
| 2003/0060374 A1 | 3/2003 | Cooke, Jr. | |
| 2003/0106690 A1 | 6/2003 | Boney et al. | |
| 2003/0114314 A1 | 6/2003 | Ballard et al. | |
| 2003/0114317 A1 | 6/2003 | Benton et al. | |
| 2003/0130133 A1 | 7/2003 | Vollmer | 507/261 |
| 2003/0131999 A1 | 7/2003 | Nguyen et al. | |
| 2003/0148893 A1 | 8/2003 | Lunghofer et al. | |
| 2003/0186820 A1 | 10/2003 | Thesing | |
| 2003/0188766 A1 | 10/2003 | Banerjee et al. | |
| 2003/0188872 A1 | 10/2003 | Nguyen et al. | |
| 2003/0196805 A1 | 10/2003 | Boney et al. | |
| 2003/0205376 A1 | 11/2003 | Ayoub et al. | 166/254.2 |
| 2003/0230408 A1 | 12/2003 | Acock et al. | |
| 2003/0230431 A1 | 12/2003 | Reddy et al. | |
| 2003/0234103 A1 | 12/2003 | Lee et al. | |
| 2004/0000402 A1 | 1/2004 | Nguyen et al. | |
| 2004/0014607 A1 | 1/2004 | Sinclair et al. | |
| 2004/0014608 A1 | 1/2004 | Nguyen et al. | |
| 2004/0040706 A1 | 3/2004 | Hossaini et al. | |
| 2004/0040708 A1 | 3/2004 | Stephenson et al. | 166/308.2 |
| 2004/0040712 A1 | 3/2004 | Ravi et al. | |
| 2004/0040713 A1 | 3/2004 | Nguyen et al. | |
| 2004/0043906 A1 | 3/2004 | Heath et al. | |
| 2004/0045712 A1 | 3/2004 | Eoff et al. | |
| 2004/0048752 A1 | 3/2004 | Nguyen et al. | |
| 2004/0055747 A1 | 3/2004 | Lee | |
| 2004/0060702 A1 | 4/2004 | Kotlar et al. | |
| 2004/0106525 A1 | 6/2004 | Willbert et al. | |
| 2004/0138068 A1 | 7/2004 | Rimmer et al. | 507/100 |
| 2004/0149441 A1 | 8/2004 | Nguyen et al. | |
| 2004/0152601 A1 | 8/2004 | Still et al. | |
| 2004/0152602 A1 | 8/2004 | Boles | |
| 2004/0173354 A1 | 9/2004 | Hinkel et al. | |
| 2004/0177961 A1 | 9/2004 | Nguyen et al. | |
| 2004/0194961 A1 * | 10/2004 | Nguyen et al. | 166/295 |
| 2004/0206499 A1 | 10/2004 | Nguyen et al. | |
| 2004/0211559 A1 | 10/2004 | Nguyen et al. | 166/276 |
| 2004/0211561 A1 | 10/2004 | Nguyen et al. | 166/280 |
| 2004/0221992 A1 | 11/2004 | Nguyen et al. | |
| 2004/0226717 A1 * | 11/2004 | Reddy et al. | 166/295 |
| 2004/0231845 A1 | 11/2004 | Cooke, Jr. | 507/219 |
| 2004/0231847 A1 | 11/2004 | Nguyen et al. | 166/295 |
| 2004/0256097 A1 | 12/2004 | Byrd et al. | |
| 2004/0256099 A1 | 12/2004 | Nguyen et al. | |
| 2004/0261993 A1 | 12/2004 | Nguyen | |
| 2004/0261995 A1 | 12/2004 | Nguyen et al. | |
| 2004/0261997 A1 | 12/2004 | Nguyen et al. | 166/281 |
| 2004/0261999 A1 | 12/2004 | Nguyen | |
| 2005/0000694 A1 | 1/2005 | Dalrymple et al. | |
| 2005/0000731 A1 | 1/2005 | Nguyen et al. | |
| 2005/0006093 A1 | 1/2005 | Nguyen | 166/281 |
| 2005/0006095 A1 | 1/2005 | Justus et al. | |
| 2005/0006096 A1 | 1/2005 | Nguyen et al. | |
| 2005/0028976 A1 | 2/2005 | Nguyen | |
| 2005/0028979 A1 | 2/2005 | Brannon et al. | |
| 2005/0034862 A1 | 2/2005 | Nguyen | |
| 2005/0034865 A1 | 2/2005 | Todd et al. | |
| 2005/0045326 A1 | 3/2005 | Nguyen | |
| 2005/0045330 A1 * | 3/2005 | Nguyen et al. | 166/281 |
| 2005/0045384 A1 | 3/2005 | Nguyen | |
| 2005/0051331 A1 * | 3/2005 | Nguyen et al. | 166/280.2 |
| 2005/0051332 A1 | 3/2005 | Nguyen et al. | 166/281 |
| 2005/0059555 A1 | 3/2005 | Dusterhoft et al. | |
| 2005/0061509 A1 | 3/2005 | Nguyen | |
| 2005/0092489 A1 | 5/2005 | Welton et al. | |
| 2005/0126780 A1 | 6/2005 | Todd et al. | 166/279 |
| 2005/0139359 A1 | 6/2005 | Maurer et al. | |
| 2005/0145385 A1 | 7/2005 | Nguyen | 166/279 |
| 2005/0173116 A1 | 8/2005 | Nguyen et al. | 523/130 |
| 2005/0178551 A1 | 8/2005 | Tolman et al. | |
| 2005/0194135 A1 | 9/2005 | Nguyen et al. | 166/272.1 |
| 2005/0194136 A1 | 9/2005 | Nguyen et al. | |
| 2005/0194140 A1 | 9/2005 | Dalrymple et al. | |

(56) References Cited

U.S. PATENT DOCUMENTS

| | | | | |
|---|---|---|---|---|
| 2005/0194142 A1 | 9/2005 | Nguyen | ............ | 166/281 |
| 2005/0197258 A1* | 9/2005 | Nguyen | ............ | 507/209 |
| 2005/0207001 A1 | 9/2005 | Laufer et al. | | |
| 2005/0257929 A1 | 11/2005 | Nguyen et al. | | |
| 2005/0263283 A1 | 12/2005 | Nguyen | ............ | 166/281 |
| 2005/0267001 A1 | 12/2005 | Weaver et al. | ............ | 507/200 |
| 2005/0269086 A1 | 12/2005 | Nguyen et al. | | |
| 2005/0269101 A1 | 12/2005 | Stegent et al. | ............ | 166/308.2 |
| 2005/0274510 A1 | 12/2005 | Nguyen et al. | | |
| 2005/0274517 A1 | 12/2005 | Blauch et al. | | |
| 2005/0274520 A1 | 12/2005 | Nguyen et al. | | |
| 2005/0277554 A1 | 12/2005 | Blauch et al. | ............ | 507/224 |
| 2005/0284632 A1 | 12/2005 | Dalrymple et al. | | |
| 2005/0284637 A1 | 12/2005 | Stegent et al. | ............ | 166/308.1 |
| 2006/0048943 A1 | 3/2006 | Parker et al. | | |
| 2006/0048944 A1 | 3/2006 | van Batenburg et al. | | |
| 2006/0052251 A1 | 3/2006 | Anderson et al. | | |
| 2006/0089266 A1 | 4/2006 | Dusterhoft et al. | ............ | 166/280.2 |
| 2006/0113078 A1 | 6/2006 | Nguyen et al. | ............ | 166/280.2 |
| 2006/0124303 A1 | 6/2006 | Nguyen et al. | | |
| 2006/0124309 A1 | 6/2006 | Nguyen et al. | ............ | 166/308.2 |
| 2006/0137875 A1 | 6/2006 | Dusterhoft et al. | | |
| 2006/0157243 A1 | 7/2006 | Nguyen | ............ | 166/280.2 |
| 2006/0175058 A1 | 8/2006 | Nguyen | ............ | 166/280.1 |
| 2006/0219405 A1 | 10/2006 | Nguyen et al. | | |
| 2006/0219408 A1 | 10/2006 | Nguyen et al. | | |
| 2006/0234871 A1* | 10/2006 | Dalrymple et al. | ............ | 507/211 |
| 2006/0234874 A1 | 10/2006 | Eoff et al. | | |
| 2006/0240994 A1 | 10/2006 | Eoff et al. | | |
| 2006/0240995 A1 | 10/2006 | Rickman et al. | | |
| 2006/0260810 A1 | 11/2006 | Weaver et al. | ............ | 166/278 |
| 2006/0260813 A1 | 11/2006 | Welton et al. | | |
| 2006/0264332 A1 | 11/2006 | Welton et al. | ............ | 507/203 |
| 2006/0266522 A1 | 11/2006 | Eoff et al. | | |
| 2006/0283592 A1 | 12/2006 | Sierra et al. | | |
| 2006/0289160 A1 | 12/2006 | van Batenburg et al. | | |
| 2007/0007010 A1 | 1/2007 | Welton et al. | | |
| 2007/0012445 A1 | 1/2007 | Nguyen et al. | | |
| 2007/0029087 A1 | 2/2007 | Nguyen et al. | | |
| 2007/0114032 A1 | 5/2007 | Stegent et al. | | |
| 2007/0131422 A1 | 6/2007 | Gatlin et al. | ............ | 166/280.1 |
| 2007/0131425 A1 | 6/2007 | Gatlin et al. | ............ | 166/280.2 |
| 2007/0187097 A1 | 8/2007 | Weaver et al. | ............ | 166/280.2 |
| 2007/0215354 A1 | 9/2007 | Rickman et al. | ............ | 166/295 |
| 2007/0267194 A1 | 11/2007 | Nguyen et al. | | |
| 2007/0289781 A1 | 12/2007 | Rickman et al. | ............ | 175/65 |
| 2008/0006405 A1 | 1/2008 | Rickman et al. | ............ | 165/295 |
| 2008/0006406 A1 | 1/2008 | Nguyen et al. | | |
| 2008/0110624 A1 | 5/2008 | Nguyen et al. | | |
| 2008/0135251 A1 | 6/2008 | Nguyen et al. | | |
| 2009/0151943 A1 | 6/2009 | Nguyen et al. | | |
| 2009/0253594 A1 | 10/2009 | Dalrymple et al. | | |
| 2010/0270023 A1 | 10/2010 | Dusterhoft | | |
| 2012/0205107 A1 | 8/2012 | Rickman | | |

FOREIGN PATENT DOCUMENTS

| | | | | |
|---|---|---|---|---|
| EP | 0933498 A1 | 8/1999 | ............ | E21B 43/02 |
| EP | 1001133 A1 | 5/2000 | ............ | E21B 43/26 |
| EP | 1132569 A2 | 9/2001 | ............ | E21B 43/02 |
| EP | 1326003 A1 | 7/2003 | ............ | E21B 43/267 |
| EP | 1362978 A1 | 11/2003 | ............ | E21B 43/02 |
| EP | 1394355 A1 | 3/2004 | ............ | E21B 43/267 |
| EP | 1396606 A2 | 3/2004 | ............ | E21B 43/267 |
| EP | 1398460 A1 | 3/2004 | ............ | E21B 43/267 |
| EP | 1403466 A2 | 3/2004 | ............ | E21B 43/267 |
| EP | 1464789 A1 | 10/2004 | ............ | E21B 43/267 |
| EP | 1607572 | 12/2005 | | |
| GB | 1107584 | 4/1965 | ............ | E21D 5/00 |
| GB | 1264180 | 12/1969 | ............ | E02D 3/14 |
| GB | 1292718 | 10/1972 | ............ | C05G 3/00 |
| GB | 2298440 | 9/1996 | | |
| GB | 2382143 A | 4/2001 | | |
| GB | 2431949 | * 5/2007 | ............ | C09K 8/50 |
| WO | WO 93/15127 | 8/1993 | ............ | C08G 63/06 |
| WO | WO 94/07949 | 4/1994 | ............ | C08G 11/00 |
| WO | WO 94/08078 | 4/1994 | ............ | D01F 6/62 |
| WO | WO 94/08090 | 4/1994 | ............ | D21H 19/28 |
| WO | WO 95/09879 | 4/1995 | ............ | C08G 63/08 |
| WO | WO 97/11845 | 4/1997 | ............ | B32B 27/08 |
| WO | WO 99/27229 | 6/1999 | ............ | E21B 43/26 |
| WO | WO 01/81914 | 11/2001 | ............ | G01N 33/24 |
| WO | WO 01/87797 A1 | 11/2001 | ............ | C04B 28/02 |
| WO | WO 02/12674 A1 | 2/2002 | ............ | E21B 37/06 |
| WO | WO 03/027431 A2 | 4/2003 | ............ | E21B 43/26 |
| WO | WO 03/027431 A3 | 4/2003 | ............ | E21B 43/26 |
| WO | WO 2004/009956 | 1/2004 | | |
| WO | WO 2004/037946 A1 | 5/2004 | ............ | C09K 7/00 |
| WO | WO 2004/038176 A1 | 5/2004 | ............ | E21B 43/27 |
| WO | WO 2004/083600 | 9/2004 | | |
| WO | WO 2004090281 | 10/2004 | | |
| WO | WO 2004104368 | 12/2004 | | |
| WO | WO 2005/021928 A2 | 3/2005 | ............ | E21B 33/138 |
| WO | WO 2005080749 | 9/2005 | | |
| WO | WO 2006/116868 | 5/2006 | ............ | E21B 43/267 |
| WO | WO 2006103385 | 10/2006 | | |
| WO | WO 2007/091058 | 8/2007 | ............ | C09K 8/62 |
| WO | WO 2007091007 | 8/2007 | | |

OTHER PUBLICATIONS

"Santrol Bioballs"; http://www.fairmounminerals.com/.sub.--SANTROL/SANTROL%20Web%20Site/B.sub- .--TD.htm., Sep. 30, 2004.

International Search Report and Opinion (PCT/GB2004/002412), Sep. 16, 2004.

International Search Report and Opinion (PCT/GB2005/003845), Jul. 31, 2006.

International Search Report and Opinion (PCT/GB2005/004009), Jan. 11, 2006.

International Search Report (CPW 21582 EP), Mar. 11, 2005.

International Search Report and Opinion (PCT/GB2004/001497), Jul. 20, 2004.

International Search Report and Opinion (PCT/GB2004/001842), Oct. 12, 2004.

International Search Report and Opinion (PCT/GB2004/002674), Dec. 16, 2004.

International Search Report and Opinion (PCT/GB2004/002968), Nov. 16, 2004.

International Search Report and Opinion (PCT/GB2004/004242), Feb. 10, 2005.

International Search Report and Opinion (PCT/GB2004-000689), Jun. 4, 2004.

International Search Report and Opinion (PCT/GB2004/002727), Mar. 11, 2005.

International Search Report and Opinion (PCT/GB2004/002747), Mar. 11, 2005.

International Search Report and Opinion (PCT/GB2005/004010), Feb. 21, 2006.

International Search Report and Opinion (PCT/GB2006/004102), Feb. 20, 2007.

International Search Report and Opinion (PCT/GB2006/004137), Jun. 5, 2008.

International Search Report and Opinion (PCT/GB2006/004852), Mar. 7, 2007.

International Search Report and Opinion (PCT/GB2007/000467), Jun. 15, 2007.

International Search Report and Opinion (PCT/GB2006/000366), Jun. 22, 2006.

International Search Report and Opinion (PCT/GB2005/003747), Dec. 12, 2005.

International Search Report and Opinion (PCT/GB2007/000421), May 10, 2007.

International Search Report and Opinion (PCT/GB2007/002273), Sep. 3, 2007.

International Search Report and Opinion (PCT/GB2004/002948), May 24, 2005.

International Search Report and Opinion (PCT/GB2005/000637), Jun. 2, 2005.

(56) References Cited

OTHER PUBLICATIONS

International Search Report and Opinion (PCT/GB2005/000634), Jun. 8, 2005.
International Preliminary Report on Patentability (PCT/GB2005/000634), Sep. 14, 2006.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., "Controlling Proppant Flowback in High-Temperature, High-Production Wells," SPE 82215, May 2003.
Dusterhoft, et al., "Maximizing Effective Proppant Permeability under High-Stress, High Gas-Rate Conditions," SPE 90398, Sep. 2004.
Office action dated Dec. 14, 2006 from U.S. Appl. No. 11/351,931, Dec. 14, 2006.
Office Action for U.S. Appl. No. 11/351,931, mailed Jan. 21, 2009.
Office Action for U.S. Appl. No. 11/880,230, mailed Jan. 22, 2009.
Office Action mailed Sep. 8, 2008 for U.S. Appl. No. 11/482,601.
U.S. Appl. No. 10/603,492, Nguyen, et al, filed Jun. 25, 2003.
U.S. Appl. No. 10/649,029, Nguyen et al., filed Aug. 27, 2003.
U.S. Appl. No. 10/727,365, Reddy et al., filed Dec. 4, 2003.
U.S. Appl. No. 10/853,879, Nguyen et al., filed May 26, 2004.
U.S. Appl. No. 10/861,829, Stegent et al., filed Jun. 4, 2004.
U.S. Appl. No. 10/868,593, Nguyen et al., filed Jun. 15, 2004.
U.S. Appl. No. 10/937,076, Nguyen et al., filed Sep. 9, 1994.
U.S. Appl. No. 10/944,973, Nguyen et al., filed Sep. 20, 2004.
U.S. Appl. No. 11/011,394, Nguyen et al., filed Dec. 12, 2004.
U.S. Appl. No. 11/035,833, Nguyen et al., filed Jan. 14, 2005.
U.S. Appl. No. 11/049,252, Van Batenburg et al., filed Feb. 2, 2005.
U.S. Appl. No. 11/053,280, Nguyen, filed Feb. 8, 2005.
U.S. Appl. No. 11/056,635, Dusterhoft et al., filed Feb. 11, 2005.
U.S. Appl. No. 12/080,647, Dalrymple et al., filed Apr. 4, 2008.
Halliburton "CobraJetFrac$^{SM}$ Service, Cost-Effective Technology That Can Help Reduce Cost per BOE Produced, Shorten Cycle Time and Reduce Capex", Apr. 2003.
Office Action mailed Apr. 10, 2007 for U.S. Appl. No. 11/482,601.
Office Action mailed Sep. 21, 2007 for U.S. Appl. No. 11/482,601.
Office Action mailed Oct. 4, 2007 for U.S. Appl. No. 11/351,931.
Office Action mailed Apr. 8, 2008 for U.S. Appl. No. 11/351,931.
U.S. Appl. No. 11/351,931 by Jimmie D. Weaver entitled "Consolidating Agent Emulsions and Associated Methods", Feb. 10, 2006.
U.S. Appl. No. 11/482,601 by Richard D. Rickman, et al. entitled "Methods and Compositions for Enhancing Proppant Pack Conductivity and Strength", Jul. 6, 2006.
U.S. Appl. No. 11/880,230 by Richard D. Rickman entitled "Consolidating Agent Emulsions and Associated Methods", Aug. 30, 2007.
U.S. Appl. No. 12/319,730 by Philip D. Nguyen, et al. entitled "Aqueous-Basesd Emulsified Consolidating Agents Suitable for Use in Drill-In Applications", Jan. 12, 2009.
Office Action for U.S. Appl. No. 11/351,931 dated Aug. 3, 2009.
Office Action for U.S. Appl. No. 11/880,230 dated Aug. 3, 2009.
Office Action for U.S. Appl. No. 11/351,931 dated Feb. 3, 2010.
Examination Report for European Patent Application No. 07705152.2, dated Jul. 2, 2009.
Official Action for Australian Patent Application No. 2007213494 dated Feb. 7, 2011.
Notice of Allowance and Notice of Allowability for U.S. Appl. No. 12/319,730 dated Feb. 15, 2011.
Office Action for U.S. Appl. No. 11/880,230 dated Apr. 6, 2011.
Notice of Allowance for U.S. Appl. No. 11/351,931 dated Aug. 9, 2010.
Office Action for U.S. Appl. No. 12/319,730 dated Dec. 15, 2010.
Office Action for U.S. Appl. No. 11/880,230 dated Dec. 23, 2010.
Ali, Syed A.; Sandstone Diagenesis, Applications to Hydrocarbon Exploration and Production; Gulf Science & Technology Company; Pittsburgh, PA; Geology & Interpretation Department, Department Report No. 4231R006; Dec. 1981.
Halliburton, *CoalStim$^{SM}$ Service, Helps Boost Cash Flow From CBM Assets*, Stimulation, HO3679 Oct. 2003, Halliburton Communications.
Halliburton, *Conductivity Endurance Technology for High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *Sand Wedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Almond et al., *Factors Affecting Proppant Flowback With Resin Coated Proppants*, SPE 30096, pp. 171-186, May 1995.
Nguyen et al., *A Novel Approach for Enhancing Proppant Consolidation: Laboratory Testing and Field Applications*, SPE Paper No. 77748, 2002.
SPE 15547, *Field Application of Lignosulfonate Gels to Reduce Channeling, South Swan Hills Miscible Unit*, Alberta, Canada, by O.R. Wagner et al, 1986.
Owens et al., *Water-flood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation by Pressure Pulse*", SPE 63035, 2000.
Nguyen et al., *New Guidelines for Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, pp. 1-138, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective in Level 1 Dual-Lateral Completion*" SPE 78697, 2002.

(56) References Cited

OTHER PUBLICATIONS

Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid for High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed p. 1.
Halliburton brochure entitled "H2Zero™ Service Introducing the Next Generation of cost-Effective Conformance Control Solutions", 2002.
Halliburton brochure entitled " " INJECTROL® A Component, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Office Action from U.S. Appl. No. 11/482,601, Sep. 21, 2007.
Office Action from U.S. Appl. No. 11/482,601, Apr. 10, 2007.
Office Action from U.S. Appl. No. 11/351,931, Dec. 14, 2006.
Office Action from U.S. Appl. No. 11/351,931, Feb. 23, 2007.
Office Action from U.S. Appl. No. 11/351,931, Oct. 4, 2007.
Office Action from U.S. Appl. No. 11/351,931, Nov. 14, 2007.
Foreign Serach Report from related counterpart application, May 10, 2007.

\* cited by examiner

COMPOSITIONS AND APPLICATIONS OF RESINS IN TREATING SUBTERRANEAN FORMATIONS

CROSS-REFERENCE TO RELATED APPLICATIONS

The present application is a continuation-in-part of U.S. patent application Ser. No. 11/482,601, entitled "Methods and Compositions for Enhancing Proppant Pack Conductivity and Strength" filed on Jul. 6, 2006 and a continuation-in-part of U.S. patent application Ser. No. 11/880,230, entitled "Consolidating Agent Emulsions and Associated Methods," filed on Jul. 20, 2007, which is a continuation-in-part of U.S. patent application Ser. No. 11/351,931, entitled "Consolidating Agent Emulsions and Associated Methods," filed on Feb. 10, 2006, the entirety of which are herein incorporated by reference.

BACKGROUND

The present invention relates to methods and compositions useful in treating subterranean formations. More particularly, the present invention relates to resin compositions comprising filler particulates that may be useful in subterranean operations, such as formation consolidation, zonal isolation, lost circulation treatments, remedial casing repairs, sealing of leaking packers, well abandonment plugs, and associated methods.

Hydrocarbon wells are often located in subterranean formations that contain unconsolidated particulates (e.g., sand, gravel, proppant, fines, etc.) that may migrate out of the subterranean formation into a well bore and/or may be produced with the oil, gas, water, and/or other fluids produced by the well. The presence of such particulates in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the flow of fluids through the formation, which may cause the particulates to shift or migrate within the formation and/or into voids therein. Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formation," "unconsolidated portion of a subterranean formation," and derivatives thereof are defined herein to include any formation that contains unconsolidated particulates, as that term is defined herein. "Unconsolidated subterranean formations" and "unconsolidated portions of a subterranean formation," as those terms are used herein, include subterranean fractures wherein unconsolidated particulates reside within the open space of the fracture (e.g., forming a proppant pack within the fracture).

One method of controlling unconsolidated particulates in subterranean formations involves placing a filtration bed containing gravel (e.g., a "gravel pack") near the well bore to present a physical barrier to the transport of unconsolidated particulates with the production of desired fluids. Typically, such "gravel-packing operations" involve the pumping and placement of a quantity of particulate into the unconsolidated subterranean formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel used. Similarly, a wide range of sizes of gravel is available to suit the characteristics of the unconsolidated particulates in the subterranean formation. To install the gravel pack, the gravel is carried to the formation in the form of a slurry by mixing the gravel with a fluid, which is usually viscosified. Once the gravel is placed in the well bore, the viscosity of the treatment fluid may be reduced, and it is returned to the surface. The resulting structure presents a barrier to migrating particulates from the formation while still permitting fluid flow.

However, the use of such gravel-packing methods may be problematic. For example, gravel packs may be time consuming and expensive to install. Due to the time and expense needed, it is sometimes desirable to place a screen without the gravel. Even in circumstances in which it is practical to place a screen without gravel, however, it is often difficult to determine an appropriate screen size to use as formation sands tend to have a wide distribution of sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for a gravel-packing. However, expandable screens may still exhibit such problems as screen erosion and screen plugging.

SUMMARY

The present invention relates to methods and compositions useful in treating subterranean formations. More particularly, the present invention relates to resin compositions comprising filler particulates that may be useful in subterranean operations, such as formation consolidation, zonal isolation, lost circulation treatments, remedial casing repairs, sealing of leaking packers, well abandonment plugs, and associated methods.

In one embodiment, the present invention provides a method comprising providing a resin composition comprising a resin and at least a plurality of filler particulates and introducing the resin composition into a well bore which penetrates at least a portion of a subterranean formation, wherein the resin composition does not form proppant aggregates or proppant particulates.

In another embodiment, the present invention provides a method comprising providing a resin composition comprising a resin and at least a plurality of filler particulates, wherein the resin composition does not comprise proppant particulates and introducing the resin composition into a well bore which penetrates at least a portion of a subterranean formation at a pressure below the fracture pressure of the subterranean formation.

In another embodiment, the present invention provides a method comprising providing a resin composition comprising a resin and at least a plurality of filler particulates, wherein the plurality of filler particulates are intimately dispersed in the resin composition and introducing the resin composition into a well bore which penetrates at least a portion of a subterranean formation.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions useful in treating subterranean formations. More particularly, the present invention relates to resin compositions comprising filler particulates that may be useful in subterranean operations, such as formation consolidation, zonal isolation, lost circulation treatments, remedial casing repairs, sealing of leaking packers, well abandonment plugs, and associated methods.

There may be several potential advantages to the methods and compositions of the present invention. One of the many potential advantages of the methods and compositions of the present invention is that they may allow for, inter alia, formation consolidation, zonal isolation, fluid loss control, and diversion of a resin composition into a desired interval. The methods and compositions of the present invention may also be useful in remedial casing repairs, sealing of packers, and well abandonment plugs. In some embodiments, the resin compositions of the present invention may allow for a reduced amount of resin to be used in certain subterranean operations through the addition of filler particulates to the resin compositions. This may be particularly advantageous due to the increasing costs of resins. Similarly, the filler particulates included in the resin compositions of the present invention may also function to strengthen the consolidation of the resin compositions, minimize any potential shrinkage of the resin compositions and provide diversion for more uniform penetration of the resin compositions into the formation interval.

The resin compositions of the present invention may comprise a resin and at least a plurality of filler particulates. The plurality of filler particulates may be intimately dispersed within the resin composition so as to prevent the formation of aggregates once the resin composition is placed into the subterranean formation. The term "resin" as used herein refers to any of numerous physically similar polymerized synthetics or chemically modified natural resins including thermoplastic materials and thermosetting materials. Resins suitable for use in the present invention include substantially all resins known and used in the art.

One type of resin suitable for use in the compositions and methods of the present invention is a two-component epoxy based resin comprising a liquid hardenable resin component and a liquid hardening agent component. The liquid hardenable resin component is comprised of a hardenable resin and an optional solvent. The solvent may be added to the resin to reduce its viscosity for ease of handling, mixing and transferring. It is within the ability of one skilled in the art with the benefit of this disclosure to determine if and how much solvent may be needed to achieve a viscosity suitable to the subterranean conditions. Factors that may affect this decision include geographic location of the well, the surrounding weather conditions, and the temperature of the subterranean formation. An alternate way to reduce the viscosity of the hardenable resin is to heat it. The second component is the liquid hardening agent component, which is comprised of a hardening agent, an optional silane coupling agent, a surfactant, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins that may be suitable for use in the methods of the present invention include those described in U.S. Pat. No. 6,582,819 issued to McDaniel, et al., U.S. Pat. No. 4,585,064 issued to Graham, et al., U.S. Pat. No. 6,677,426 issued to Noro, et al., and U.S. Pat. No. 7,153,575 issued to Anderson, et al., each of which are incorporated by reference herein in their entirety.

The hardenable resin may be included in the liquid hardenable resin component in an amount in the range of about 5% to about 100% by weight of the liquid hardenable resin component. It is within the ability of one skilled in the art with the benefit of this disclosure to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents may include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, isomers thereof, and combinations thereof. Selection of an appropriate solvent is dependent on the resin composition chosen and is within the ability of one skilled in the art with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. The chosen hardening agent often effects the range of temperatures over which a hardenable resin is able to cure. By way of example and not of limitation, in subterranean formations having a temperature of about 60° F. to about 250° F., amines and cyclo-aliphatic amines such as piperidine, triethylamine, tris(dimethylaminomethyl) phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

The optional silane coupling agent may be used, among other things, to act as a mediator to help bond the resin to particulates present in the formation. Examples of suitable silane coupling agents include, but are not limited to, N-2-(aminoethyl)-3-aminopropyltrimethoxysilane, 3-glycidoxypropyltrimethoxysilane, and combinations thereof. The silane coupling agent may be included in the liquid hardening agent component in an amount capable of sufficiently bonding the resin to the particulate. In some embodiments of the present invention, the silane coupling agent used is included in the liquid hardening agent component in the range of about 0.1% to about 3% by weight of the liquid hardening agent component.

Any surfactant compatible with the hardening agent may be used in the liquid hardening agent component. Such surfactants include, but are not limited to, alkyl phosphonate surfactant (e.g., a $C_{12}$-$C_{22}$ alkyl phosphonate surfactant), ethoxylated nonyl phenol phosphate esters, cationic surfactants, nonionic surfactants, and combinations thereof. Examples of surfactant mixtures are described in U.S. Pat. No. 6,311,773 issued to Todd et al. on Nov. 6, 2001, which is incorporated by reference herein in its entirety. The surfactant or surfactants that may be used are included in the liquid hardening agent component in an amount in the range of about 1% to about 10% by weight of the liquid hardening agent component.

Use of a diluent or liquid carrier fluid in the liquid hardening agent component is optional and may be used to reduce the viscosity of the liquid hardening agent component for ease of handling, mixing and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, hexoxyethanol, isomers thereof, and combinations thereof. Selection of an appropriate liquid carrier fluid is dependent on, inter alia, the resin composition chosen.

Other resins suitable for use in the present invention are furan-based resins. Suitable furan-based resins include, but are not limited to, furfuryl alcohol resins, furfural resins, mixtures furfuryl alcohol resins and aldehydes, mixtures of furan resins and phenolic resins, and combinations thereof. Of these, furfuryl alcohol resins may be preferred. A furan-based resin may be combined with a solvent to control viscosity if desired. Suitable solvents for use in the furan-based consolidation fluids of the present invention include, but are not limited to 2-butoxy ethanol, butyl lactate, butyl acetate, tetrahydrofurfuryl methacrylate, tetrahydrofurfuryl acrylate, esters of oxalic, maleic and succinic acids, furfuryl acetate, and combinations thereof. Of these, 2-butoxy ethanol is preferred. In some embodiments, the furan-based resins suitable for use in the present invention may be capable of enduring temperatures well in excess of 350° F. without degrading. In some embodiments, the furan-based resins suitable for use in the present invention are capable of enduring temperatures up to about 700° F. without degrading.

Optionally, the furan-based resins suitable for use in the present invention may further comprise a curing agent, inter alia, to facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as, inter alia, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

Still other resins suitable for use in the methods of the present invention are phenolic-based resins. Suitable phenolic-based resins include, but are not limited to, terpolymers of phenol, phenolic formaldehyde resins, mixtures of phenolic and furan resins, and combinations thereof. In some embodiments, a mixture of phenolic and furan resins may be preferred. A phenolic-based resin may be combined with a solvent to control viscosity if desired. Suitable solvents for use in the present invention include, but are not limited to butyl acetate, butyl lactate, furfuryl acetate, 2-butoxy ethanol, and combinations thereof. Of these, 2-butoxy ethanol may be preferred in some embodiments.

Yet another resin-type material suitable for use in the methods of the present invention is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, alkyl phosphonate surfactants (e.g., $C_{12}$-$C_{22}$ alkyl phosphonate surfactants), ethoxylated nonyl phenol phosphate esters, cationic surfactants, nonionic surfactants, and combinations thereof.

In some embodiments, the resin may be provided as an emulsion. In embodiments where the resin is provided as an emulsion, the emulsion may have an aqueous external phase and an internal resin phase. Examples of suitable resin emulsion compositions are described in U.S. Patent Application Publication Nos. 2007/0187097 and 2007/0289781, which are incorporated by reference in their entirety.

In other embodiments, a resin suitable for use in the compositions and methods of the present invention comprise crosslinkable aqueous polymer compositions. Generally, suitable crosslinkable aqueous polymer compositions comprise an aqueous solvent, a crosslinkable polymer, and a crosslinking agent. Such compositions are similar to those used to form gelled treatment fluids, such as fracturing fluids, but according to the methods of the present invention, they are not exposed to breakers or de-linkers, and so they retain their viscous nature over time. The aqueous solvent may be any aqueous solvent in which the crosslinkable composition and the crosslinking agent may be dissolved, mixed, suspended, or dispersed therein to facilitate gel formation. For example, the aqueous solvent used may be freshwater, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. The most suitable polymers are thought to be those that would absorb or adhere to the rock surfaces so that the rock matrix may be strengthened without occupying a lot of the pore space and/or reducing permeability. Examples of suitable acrylamide-containing polymers include polyacrylamide, partially hydrolyzed polyacrylamide, copolymers of acrylamide and acrylate, and carboxylate-containing terpolymers and tetrapolymers of acrylate. Combinations of these may be suitable as well. Additional examples of suitable crosslinkable polymers include hydratable polymers comprising polysaccharides and derivatives thereof, and that contain one or more of the monosaccharide units, galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Combinations of these may be suitable as well. Suitable hydratable synthetic polymers and copolymers that may be used in the crosslinkable aqueous polymer compositions include, but are not limited to, polycarboxylates such as polyacrylates and polymethacrylates; polyacrylamides; methylvinyl ether polymers; polyvinyl alcohols; and polyvinylpyrrolidone. Combinations of these may be suitable as well. The crosslinkable polymer used should be included in the crosslinkable aqueous polymer composition in an amount sufficient to form the desired gelled substance in the subterranean formation. In some embodiments of the present invention, the crosslinkable polymer may be included in the crosslinkable aqueous polymer composition in an amount in the range of from about 1% to about 30% by weight of the aqueous solvent. In another embodiment of the present invention, the crosslinkable polymer may be included in the crosslinkable aqueous polymer composition in an amount in the range of from about 1% to about 20% by weight of the aqueous solvent.

The crosslinkable aqueous polymer compositions suitable for use in the present invention may further comprise a crosslinking agent for crosslinking the crosslinkable polymers to form the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions in an amount sufficient to provide, among other things, the desired degree of crosslinking. In some embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, among other things, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

The resin compositions of the present invention further comprise at least a plurality of filler particulates. Suitable filler particulates may include any particle that does not adversely react with the other components used in accordance with this invention or with the subterranean formation. Examples of suitable filler particulates include silica, glass, clay, alumina, fumed silica, carbon black, graphite, mica, meta-silicate, calcium silicate, calcine, kaoline, talc, zirconia, titanium dioxide, fly ash, boron, and combinations thereof. In some embodiments, the filler particulates may range in size of about 0.01 µm to about 100 µm. In some embodiments, the filler particulates may range in size of about 0.5 µm to about 5 µm. As will be understood by one skilled in the art, particles of smaller average size may be particularly useful in situations where it is desirable to obtain high consolidation strength. In addition, as will be understood by one skilled in the art, it is desirable that the filler particulates have a density that is substantially similar or slightly higher than the resin in an effort to prevent any potential of settling of the filler particulates.

In certain embodiments, the filler particulates may be included in the resin composition in an amount of about 0.1% to about 70% by weight of the resin composition. In other embodiments, the filler particulates may be included in the resin composition in an amount of about 0.5% to about 40% by weight of the resin composition. In some embodiments, the filler particulates may be included in the resin composition in an amount of about 1% to about 10% by weight of the resin composition. Some examples of suitable resin compositions comprising filler particulates are described in U.S. Patent Application Publication Nos. 2008/0006405 issued to Rickman, et al., which is herein incorporated by reference in its entirety.

In some embodiments, the resin compositions disclosed herein may be used to service a well bore that penetrates a subterranean formation. It is to be understood that the term "subterranean formation" encompasses both areas below exposed earth and areas below earth covered by water, such as ocean water or fresh water. Similarly, in some embodiments, the resin compositions may be injected into a subterranean formation comprising coal or shale. Servicing a well bore can include, without limitation, treating formations for formation consolidation, zonal isolations as in water/gas shutoff, major lost circulation treatments, remedial casing repairs, sealing of leaking packers, and well abandonment plugs. For instance, the resin compositions may viscosify in a loss-circulation zone and thereby slow down the fluid circulation. The resin compositions may set into a flexible, resilient, and tough material, which may prevent further fluid loss when circulation is resumed. The resin compositions may withstand substantial pressure, e.g., the hydrostatic pressure of a drilling fluid or cement slurry, without being dislodged or extruded. The resin compositions may provide a relatively viscous mass inside the loss-circulation zone. This mass may plug the zone and inhibit loss of subsequently pumped drilling fluid, which allows for further drilling. Methods for introducing compositions into a well bore to seal subterranean zones are described in U.S. Pat. Nos. 5,913,364, 6,167,967, and 6,258,757, each of which is incorporated by reference herein in their entirety.

In some embodiments, the resin compositions described herein may be placed into the subterranean formation at a pressure below the fracture pressure of the subterranean formation. In some embodiments, the resin compositions described herein may be placed into the subterranean formation at a pressure above the fracture pressure of the subterranean formation. In some embodiments, the resin compositions described herein may be placed into the subterranean formation at a pressure equal to the fracture pressure of the subterranean formation. A person of ordinary skill in the art would be able to determine a fracture pressure for any given subterranean formation.

In some embodiments, the cure time of the resin compositions disclosed herein may be tailored through the use of a particular resin. Furthermore, the resin compositions disclosed herein may be suitable in subterranean formations with a bottom hole temperature of about 65° F. to 550° F.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by any amount (e.g., 1 percent, 2 percent, 5 percent, or, sometimes, 10 to 20 percent). Whenever a numerical range, R, with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   providing a resin composition comprising a resin and at least a plurality of filler particulates,
      wherein the resin comprises a two-component epoxy based resin comprising a liquid hardenable resin component and a liquid hardening agent component;
      wherein at least a portion of the plurality of filler particulates comprises at least one filler particulate selected from the group consisting of: alumina, zirconia, titanium dioxide, boron, and combinations of such particulates; and,
      wherein the filler is present in the resin composition from about 1% to about 10% by weight of the resin composition;
   introducing the resin composition into a well bore which penetrates at least a portion of a subterranean formation, wherein the resin composition does not form proppant aggregates or proppant particulates; and
   allowing the resin composition to viscosify to form a flexible material, wherein the material is able to withstand hydrostatic pressure in the well bore once it has viscosified.

2. The method of claim 1 wherein the liquid hardenable resin component comprises a hardenable resin.

3. The method of claim 2 wherein the hardenable resin is present in the liquid hardenable resin component in an amount in the range of about 5% to about 100% by weight of the liquid hardenable resin component.

4. The method of claim 1 wherein the liquid hardening agent component comprises a hardening agent and a surfactant.

5. The method of claim 4 wherein the liquid hardening agent component further comprises a silane coupling agent and a liquid carrier.

6. The method of claim 1 wherein the plurality of filler particulates have a density that is substantially similar to the resin.

7. A method comprising:
   providing a resin composition comprising a resin and at least a plurality of filler particulates, wherein the resin comprises a two-component epoxy based resin comprising a liquid hardenable resin component and a liquid hardening agent component;

wherein at least a portion of the plurality of filler particulates comprises at least one filler particulate selected from the group consisting of: clay, alumina, carbon black, meta-silicate, calcium silicate, calcine, kaolin, talc, zirconia, titanium dioxide, boron, and combinations of such particulates, wherein the resin composition does not comprise proppant aggregates or proppant particulates;

wherein the filler is present in the resin composition from about 1% to about 10% by weight of the resin composition;

introducing the resin composition into a well bore which penetrates at least a portion of a subterranean formation at a pressure above the fracture pressure of the subterranean formation; and allowing the resin composition to viscosify to form a flexible material, wherein the material is able to withstand hydrostatic pressure in the well bore once it has viscosified.

8. The method of claim 7 wherein the liquid hardenable resin component comprises a hardenable resin.

9. The method of claim 8 wherein the liquid hardenable resin component further comprises a solvent.

10. The method of claim 8 wherein the hardenable resin is present in the liquid hardenable resin component in an amount in the range of about 5% to about 100% by weight of the liquid hardenable resin component.

11. The method of claim 7 wherein the liquid hardening agent component comprises a hardening agent and a surfactant.

12. The method of claim 11 wherein the liquid hardening agent component further comprises a silane coupling agent and a liquid carrier.

13. A method comprising:
providing a liquid resin composition comprising a resin and at least a plurality of filler particulates dispersed therein,
wherein the resin comprises a two-component epoxy based resin comprising a liquid hardenable resin component and a liquid hardening agent component;
wherein at least a portion of the plurality of filler particulates comprises at least one filler particulate selected from the group consisting of: alumina, zirconia, titanium dioxide, boron, and combinations of such particulates, wherein the plurality of filler particulates are intimately dispersed in the resin composition and wherein the filler particulates range in size from about 0.5 microns to about 5 microns;
introducing the liquid resin composition into a well bore which penetrates at least a portion of a subterranean formation; and
allowing the resin composition to viscosify to form a flexible material, wherein the material is able to withstand hydrostatic pressure in the well bore once it has viscosified.

14. The method of claim 13 wherein the plurality of filler particulates are present in an amount from about 0.1% to about 70% by weight of the resin composition.

15. The method of claim 13 wherein the liquid hardenable resin component comprises a hardenable resin in an amount in the range of about 5% to about 100% by weight of the liquid hardenable resin component.

16. The method of claim 15 wherein the liquid hardenable resin component further comprises a solvent in an amount in the range of 0.1% to about 30% by weight of the liquid hardenable resin component.

17. The method of claim 13 wherein a hardening agent is present in the liquid hardening agent component in an amount in the range of about 0.1% to about 95% by weight of the liquid hardening agent component.

* * * * *